United States Patent
Tokunaga et al.

(10) Patent No.: US 6,683,544 B2
(45) Date of Patent: Jan. 27, 2004

(54) SEAT POSITION SENSOR

(75) Inventors: Ichiro Tokunaga, Miyagi-ken (JP); Yoshihiro Sudo, Miyagi-ken (JP)

(73) Assignee: ALPS Electric Co., Ltd, Tokyo (JP)

( * ) Notice: Subject to any disclaimer, the term of this patent is extended or adjusted under 35 U.S.C. 154(b) by 70 days.

(21) Appl. No.: 10/146,206

(22) Filed: May 14, 2002

(65) Prior Publication Data

US 2002/0190874 A1 Dec. 19, 2002

(30) Foreign Application Priority Data

Jun. 13, 2001 (JP) .......................... 2001-179317

(51) Int. Cl.$^7$ .......................... H03M 1/22; B60R 21/32
(52) U.S. Cl. .................... 341/15; 280/735; 324/207.24; 324/207.26
(58) Field of Search .......................... 280/735; 248/429; 296/65.13, 68.1, 65.15; 324/207.24, 207.26; 341/15

(56) References Cited

U.S. PATENT DOCUMENTS

| | | | | |
|---|---|---|---|---|
| 4,909,560 A | * | 3/1990 | Ginn | 296/65.15 |
| 6,053,529 A | | 4/2000 | Frusti et al. | 280/735 |
| RE37,466 E | * | 12/2001 | Allen et al. | 280/735 |
| 6,593,735 B2 | * | 7/2003 | Becker | 280/735 |

* cited by examiner

*Primary Examiner*—Jean JeanGlaude
(74) *Attorney, Agent, or Firm*—Beyer Weaver & Thomas

(57) ABSTRACT

The seat position sensor includes a housing, a magnetoelectric converting element which performs changeover of an output at a given magnetic field intensity, and a magnet which is held by the housing at a position where the magnet faces the magnetoelectric converting element in an opposed manner. A shielding plate is capable of entering into or exiting from a space defined between the magnetoelectric converting element and the magnet. An inverse bias magnet which applies a magnetic field of an inverse direction to the magnet is provided to a side opposite to the magnet side while sandwiching the magnetoelectric converting element therebetween.

7 Claims, 8 Drawing Sheets

SEAT POSITION SENSOR

BACKGROUND OF THE INVENTION

1. Field of the Invention

The present invention relates to a seat position sensor which is served for detecting a position of a seat of an automobile or the like and for controlling an inflation of an airbag or the like.

2. Description of the Related Art

To explain a conventional seat position sensor using drawings, FIG. 10 is a perspective view showing the conventional seat position sensor in a mounted state, FIG. 11 is an enlarged perspective view showing the conventional seat position sensor in the mounted state, FIG. 12 is a cross-sectional view of an essential part of the conventional seat position sensor in the mounted state, and FIG. 13 is a cross-sectional view of the essential part of the conventional seat position sensor.

To explain the conventional seat position sensor in conjunction with FIG. 10 to FIG. 13, each first rail 51 is constituted by bending a metal plate in an approximately U shape and a pair of these first rails 51 are fixed to both sides of a lower surface of a seat 60. A shielding plate 54 is constituted by bending a metal plate in an L shape and includes an elongated planer base 54a and a side wall 54b which is formed by being bent and extended downwardly from an end of the base 54a, wherein the base 54a is fixed to the first rail 51 and the shielding plate 54 is slidably moved together with the first rail 51.

A second rail 52 is constituted by bending a metal sheet in an approximately U shape and is combined with the first rail 51 such that the second rail 52 forms an inversely projecting shape as shown in FIG. 12. The second rail 52 is fixed to an indoor floor surface of a vehicle using a holding strut 53 bent in an L shape.

A seat position sensor 55 is formed of a molded product made of synthetic resin and includes a base body 55a which is formed in a U shape, a rectangular magnet 56 which is embedded into a first side wall 55b of the base body 55a, and a rectangular Hall IC 57 which is embedded into a second side wall 55c which is formed in an opposed manner with respect to the first side wall 55b and faces the magnet 56 in an opposed manner. As the magnet 56, a magnet having a strong magnetic force such as samarium or cobalt can be used. The seat position sensor 55 having such a constitution is mounted on the second rail 52 by means of a stay 58.

In the state that seat position sensor 55 is mounted, the side wall 54b of the shielding plate 54 can enter into or exit from a space 55d defined between the first and second side walls 55b, 55c, wherein when the shielding plate 54 is positioned inside the space 55d, a magnetic field generated by the magnet 56 is shielded by the shielding plate 54 so that the magnetic flux density which the Hall IC 57 receives is lowered thus generating the changeover of an output of the Hall IC 57.

To explain the manner of operation of the conventional seat position sensor 55 having the abovementioned constitution and the mounting state, when the seat 60 is moved, the shielding plate 54 enters into or exits from the space 55d of the seat position sensor 55 so that the changeover of the output of the Hall IC 57 is performed. Due to this changeover of the signal, a gas flow-out quantity at the time of inflation of an airbag (not shown in the drawing), for example, is changed so that an airbag is adjusted.

In the conventional seat position sensor which has the abovementioned constitution and performs the abovementioned operation, as explained above, when the shielding plate 54 is positioned inside the space 55d, the flux density which the Hall IC 57 receives is lowered. However, since a gap is formed between the side wall 54b of the shielding plate 54 and the space 55d and the magnetism leaks from this gap. Here, the Hall ICs 57 have considerable irregularities with respect to sensitivity, that is, the Hall ICs 57 have the considerable irregularities with respect to the magnetic flux density at the time of changeover so that when the Hall IC having a favorable sensitivity (the Hall IC which is changed over with small magnetic flux density) is used, there arises a problem that the changeover of the output of the Hall IC is not performed due to the influence of the leaked magnetic flux. Although it may be possible to use the Hall IC having a poor sensitivity (the Hall IC which is changed over with large magnetic flux density) to cope with such a problem, there arises a problem that the yield rate is drastically decreased.

SUMMARY OF THE INVENTION

Accordingly, it is an object of the present invention to provide a seat position sensor which can ensure a high yield rate by reducing influence of leaked magnetic flux using a bias magnet, by ensuring changeover of a magnetoelectric converting element by controlling a magnetic flux density and further by using a magnetoelectric converting element in a wide range.

According to a first aspect of the present invention to solve the abovementioned problems, a seat position sensor of the present invention includes a housing, a magnetoelectric converting element which is held by the housing and performs changeover of an output at a given magnetic field intensity, and a magnet which is held by the housing at a position where the magnet faces the magnetoelectric converting element in an opposed manner, wherein a shielding plate is capable of entering into or exiting from a space defined between the magnetoelectric converting element and the magnet, and an inverse bias magnet which applies a magnetic field of an inverse direction to the magnet is provided at a side opposite to the magnet side while sandwiching the magnetoelectric converting element therebetween.

Further, according to a second aspect of the present invention to solve the abovementioned problems, the housing of the seat position sensor of the present invention includes a first side wall, a second side wall which faces the first side wall in an opposed manner, and a connection wall which connects the first with the second side walls and form the space into a recess, wherein the magnetoelectric converting element and the magnet are respectively mounted on either one of the first and the second side walls, the shielding plate is formed in a planar shape and is allowed to be disposed inside the recess from an opening side of the recess toward the connecting wall, and an end surface of the shielding plate at the connection wall side is positioned closer to the connection wall side than the magnet.

Further, according to a third aspect of the present invention to solve the abovementioned problems, the housing is arranged such that the open-side of the recess of the space of the seat position sensor of the present invention is positioned downwardly.

Further, according to a fourth aspect of the present invention to solve the abovementioned problems, the bias magnet is arranged at the first or the second side wall on which the magnetoelectric converting element of the seat position sensor of the present invention is arranged and the bias magnet, the magnetoelectric converting element and the magnet are positioned on one straight line.

Further, according to a fifth aspect of the present invention to solve the abovementioned problems, the magnetoelectric converting element of the seat position sensor of the present invention is constituted of a Hall element and a magnetization surface of the magnet is parallel to the shielding plate.

Further, according to a sixth aspect of the present invention to solve the abovementioned problems, the changeover of the output of the magnetoelectric converting element is performed only once with respect to movement in an exiting direction or in an entering direction of the shielding plate which is capable of entering into or exiting from the space of the seat position sensor of the present invention.

Further, according to a seventh aspect of the present invention to solve the abovementioned problems, the housing of the seat position sensor of the present invention is arranged at a movable member side including a seat, the shielding plate is arranged at a fixed member side which holds the movable member in a movable manner, and the housing is slidably moved along with slide movement of the movable member so as to allow the shielding plate to enter into or exit from the space.

DETAILED DESCRIPTION OF THE PREFERRED EMBODIMENTS

Figure 1:
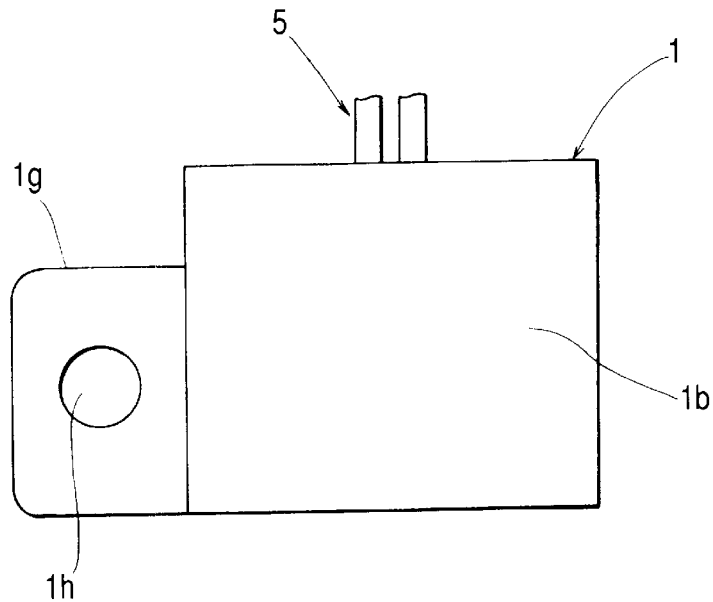
FIG. 1 is a front view of a seat position sensor of the present invention.
Figure 2:
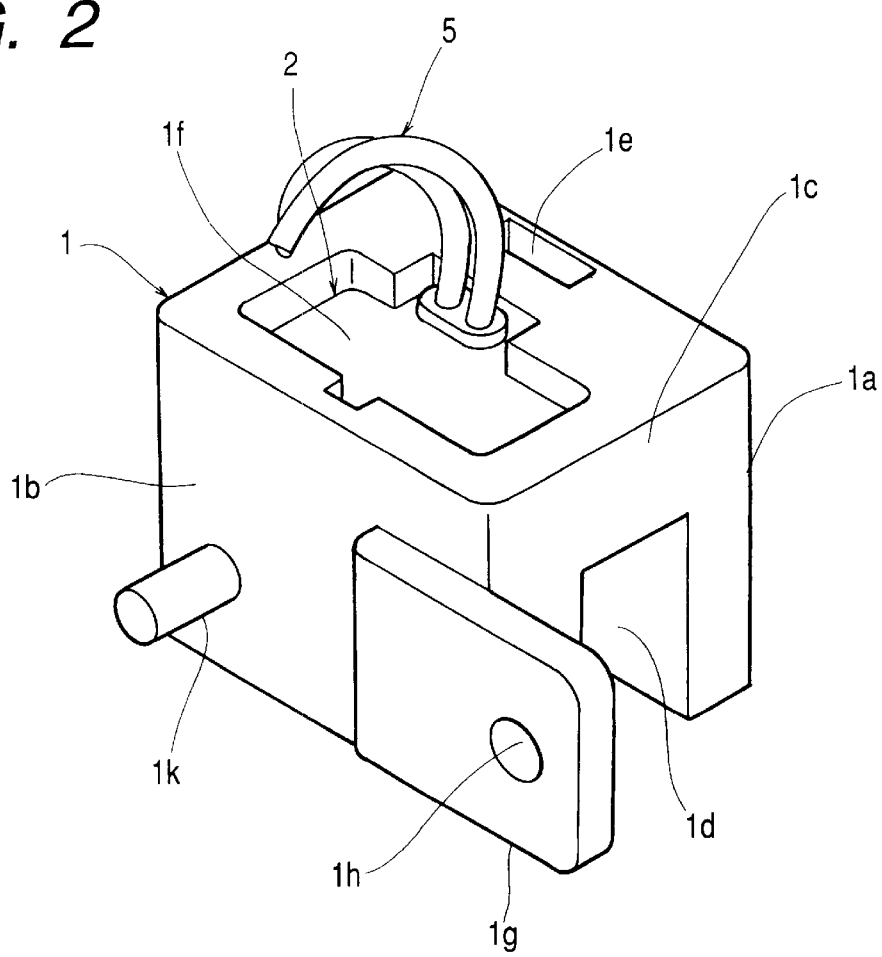
FIG. 2 is a perspective view of the seat position sensor of the present invention.
Figure 3:
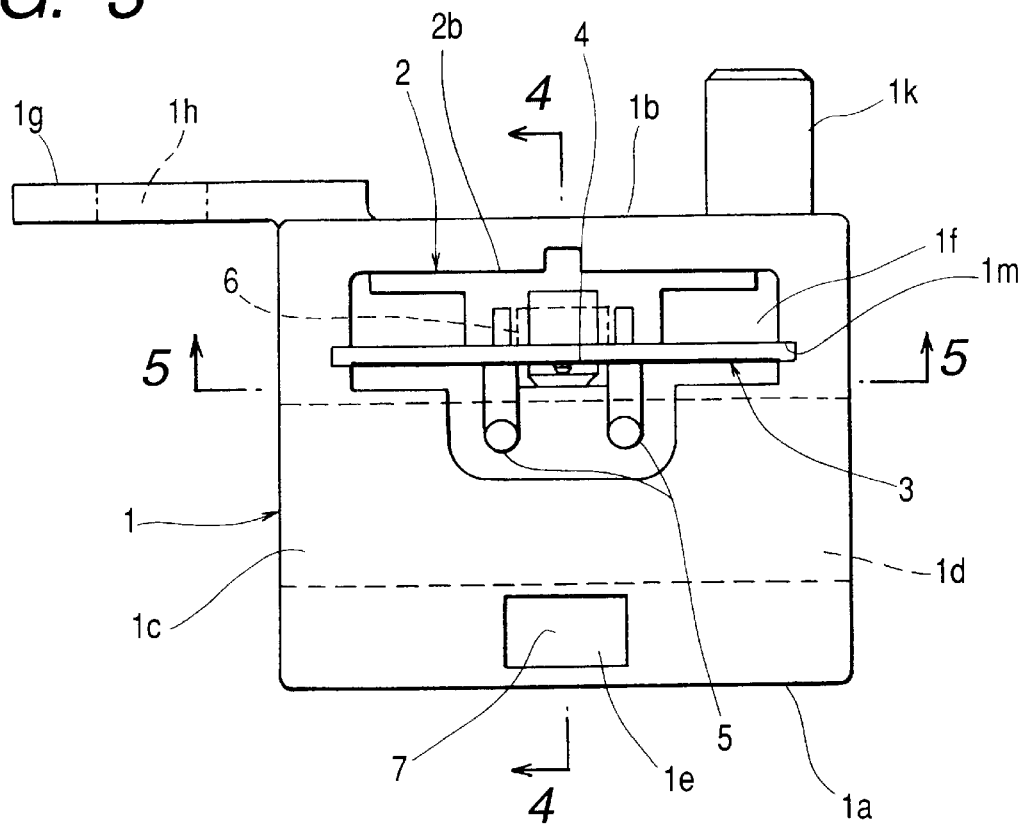
FIG. 3 is an upper plan view showing the inside of the seat position sensor of the present invention.
Figure 4:
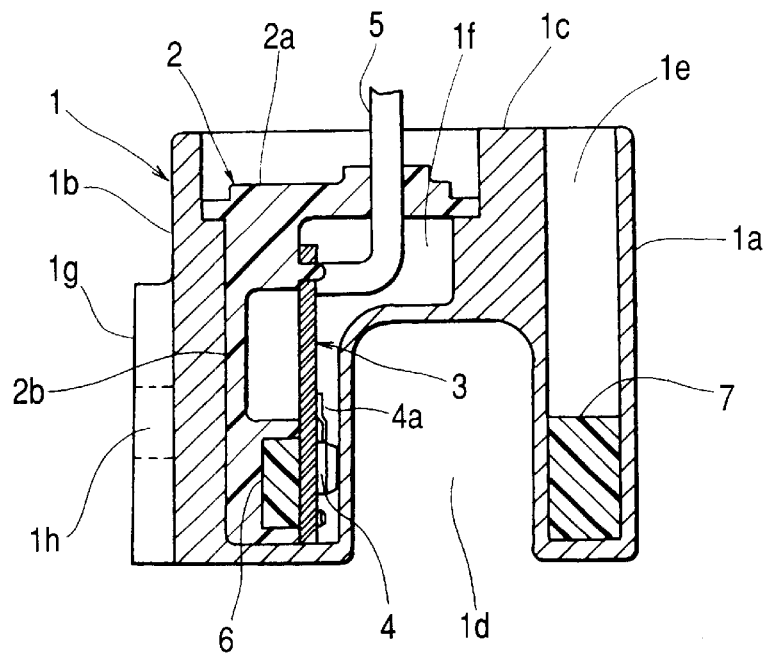
FIG. 4 is a cross-sectional view taken along a line 4—4 of FIG. 3.
Figure 5:
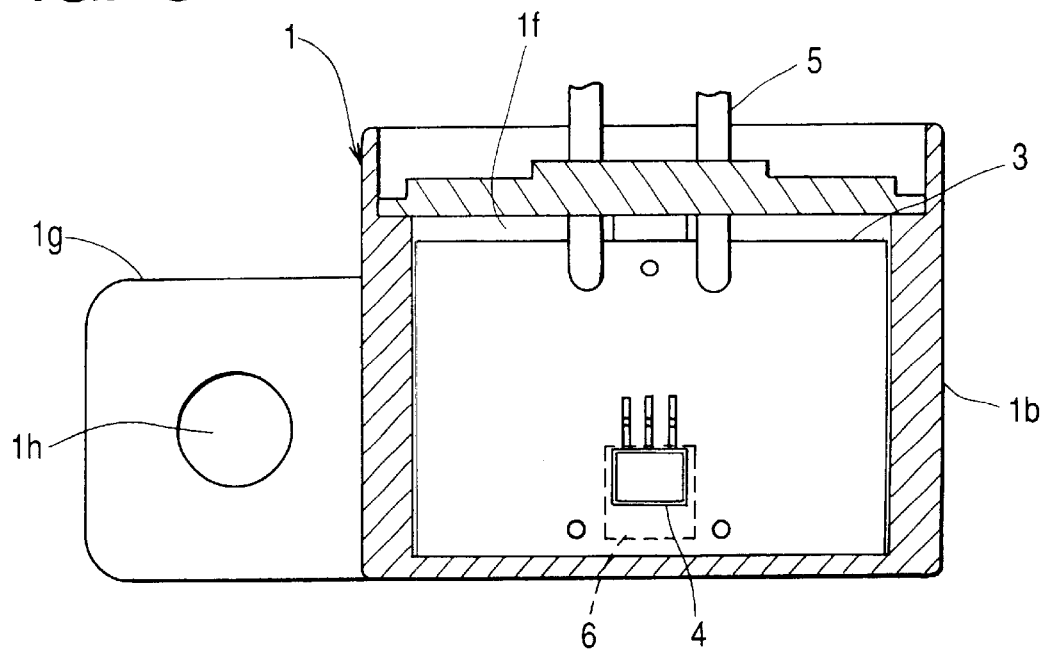
FIG. 5 is a cross-sectional view taken along a line 5—5 of FIG. 3.
Figure 6:
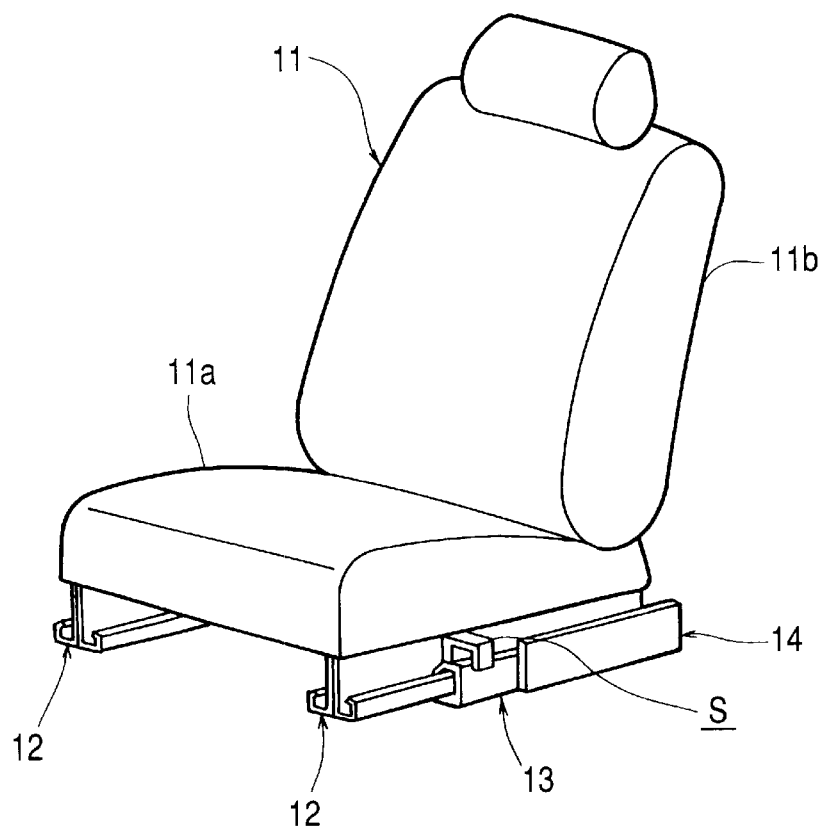
FIG. 6 is a perspective view showing a mounting state of the seat position sensor of the present invention.
Figure 7:
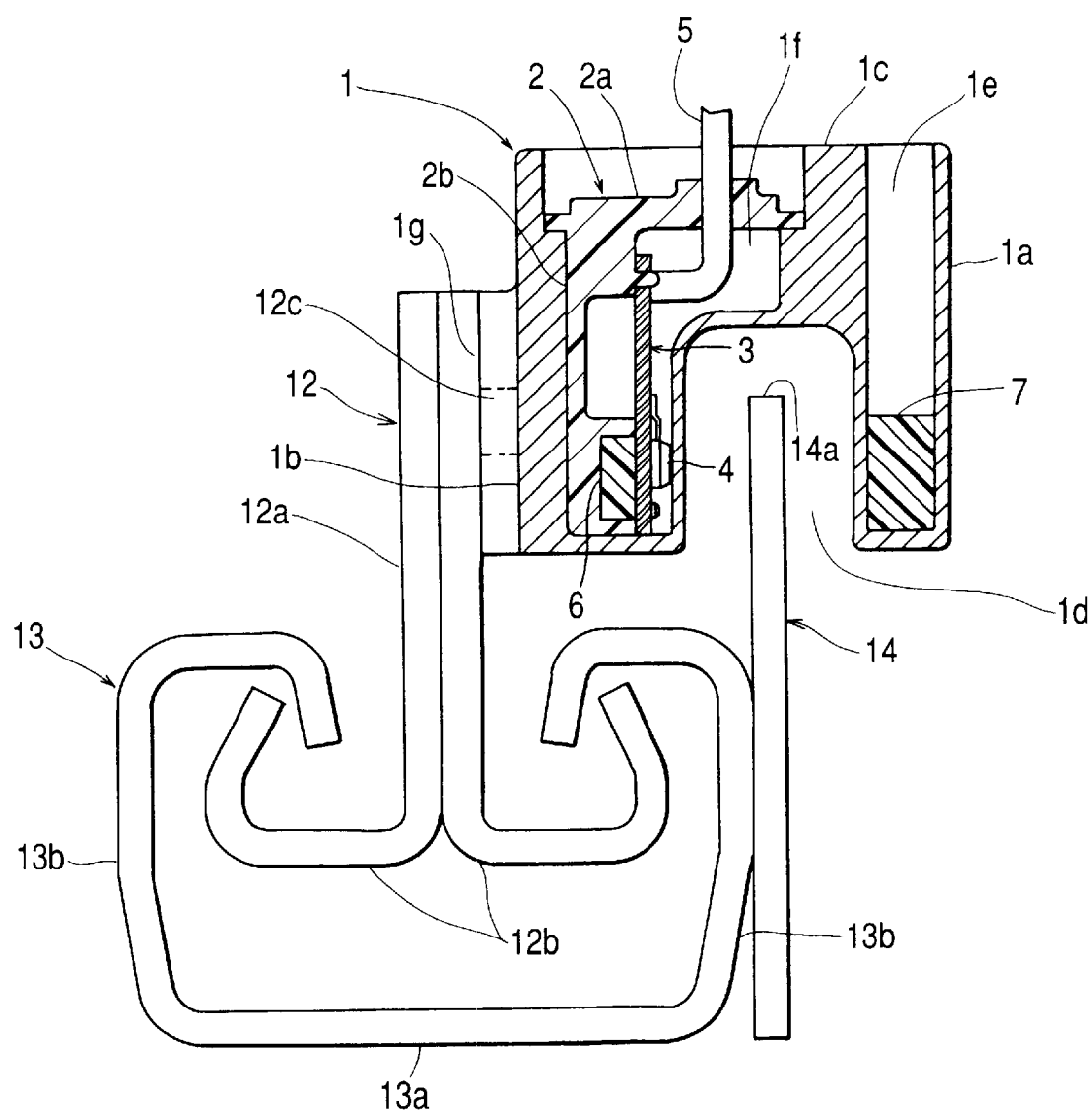
FIG. 7 is an explanatory view for explaining the operation of the seat position sensor of the present invention.
Figure 8:
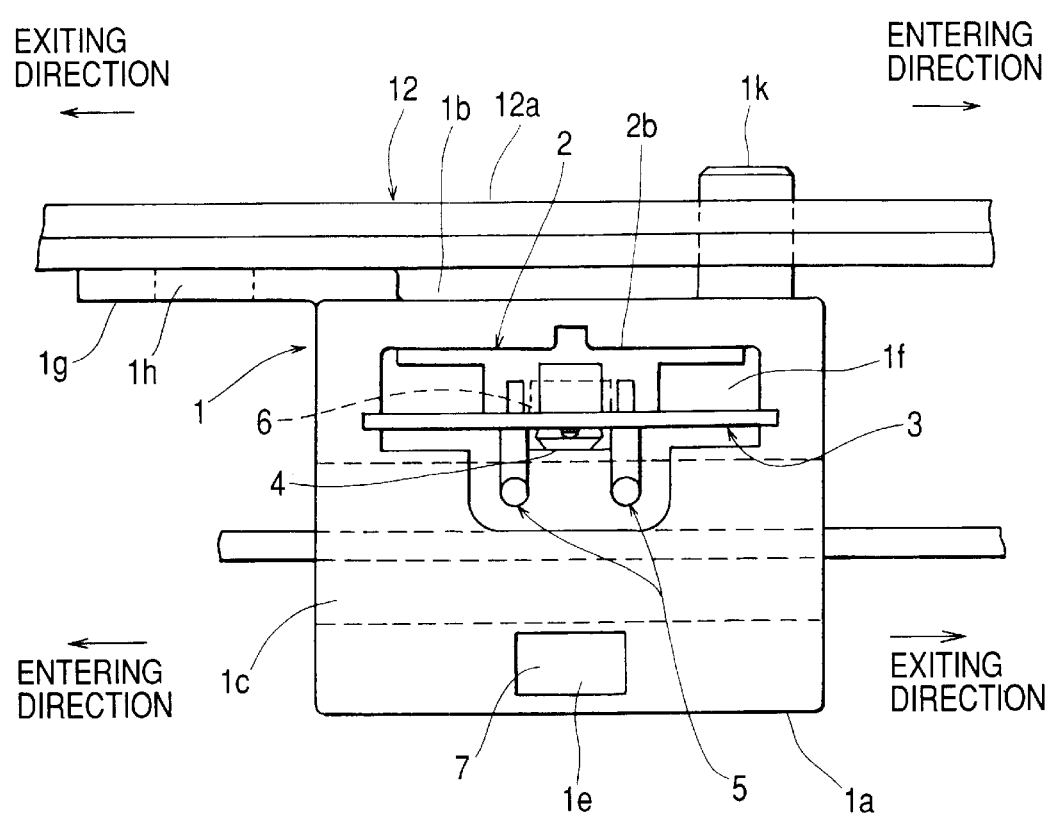
FIG. 8 is an explanatory view for explaining the operation of the seat position sensor of the present invention.
Figure 9:
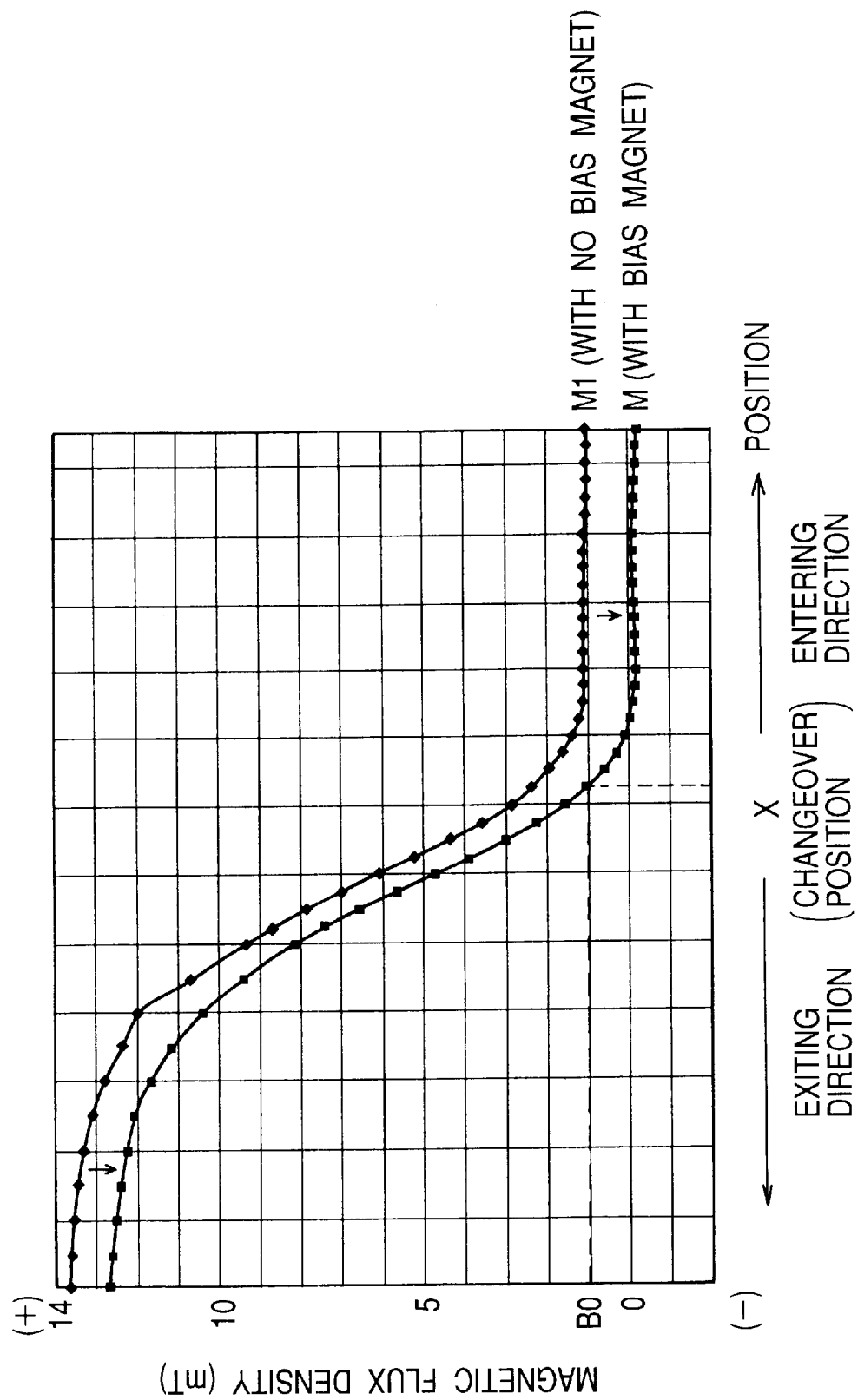
FIG. 9 is a graph showing the positional relationship between the magnetic flux density which the magnetoelectric converting element detects and the shielding plate.
Figure 10:
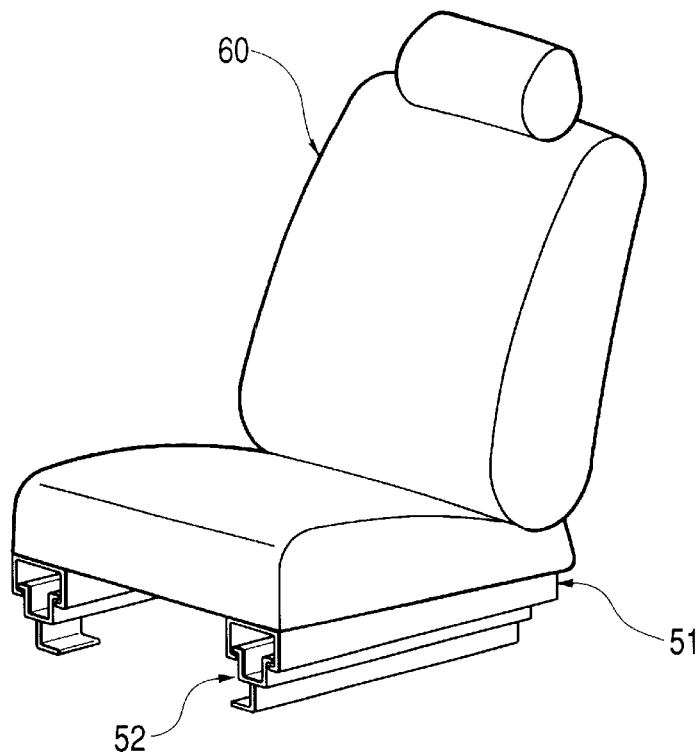
FIG. 10 is a perspective view showing a state in which a conventional seat position sensor is mounted.
Figure 11:
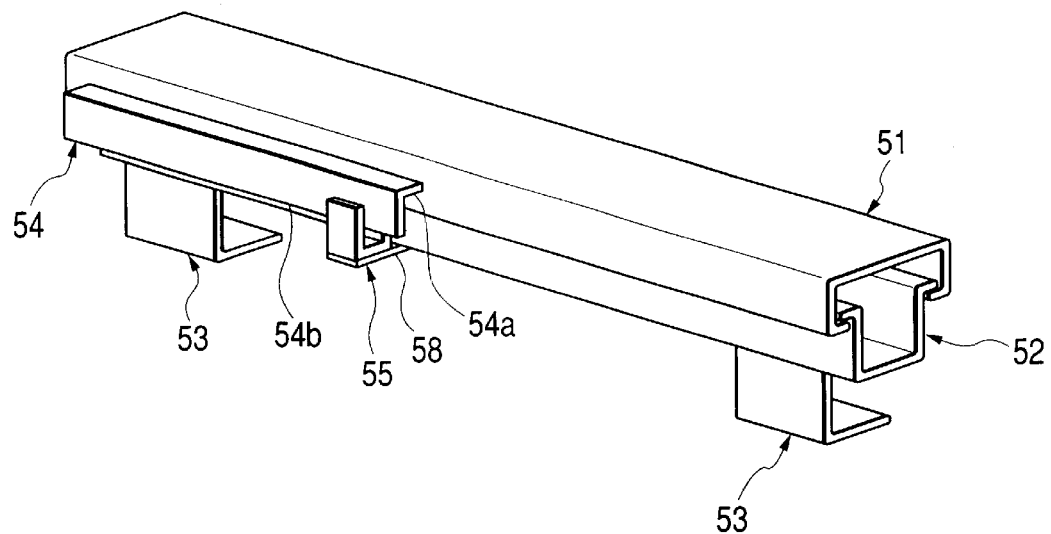
FIG. 11 is an enlarged perspective view showing a state in which a conventional seat position sensor is mounted.
Figure 12:
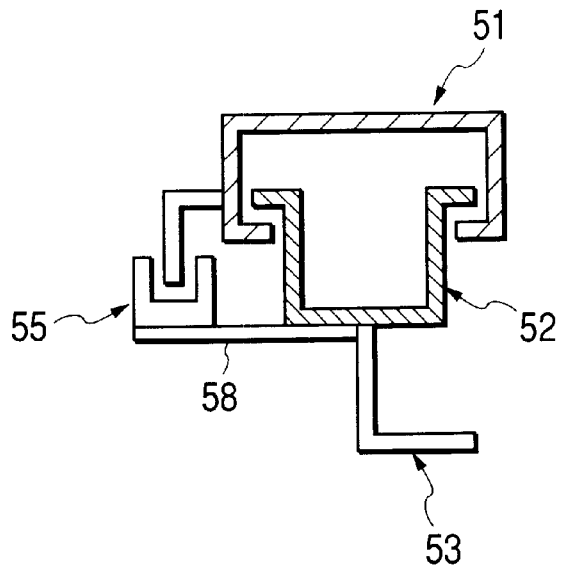
FIG. 12 is a cross-sectional view of an essential part of the conventional seat position in the state that the conventional seat position sensor is mounted.
Figure 13:
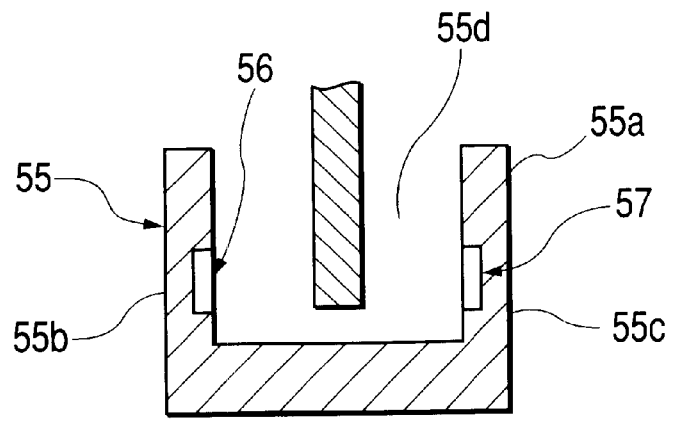
FIG. 13 is a cross-sectional view of an essential part of the conventional seat position sensor.

To explain drawings showing a seat position sensor S of the present invention, FIG. 1 is a front view of a seat position sensor of the present invention, FIG. 2 is a perspective view of the seat position sensor of the present invention, FIG. 3 is an upper plan view showing the inside of the seat position sensor of the present invention, FIG. 4 is a cross-sectional view taken along a line 4—4 of FIG. 3, FIG. 5 is a cross-sectional view taken along a line 5—5 of FIG. 3, FIG. 6 is a perspective view showing a mounting state of the seat position sensor of the present invention, FIGS. 7 and 8 are explanatory views for explaining the operation of the seat position sensor of the present invention, and FIG. 9 is a graph showing the positional relationship between the magnetic flux density which the magnetoelectric converting element detects and the shielding plate.

To explain the seat position sensor of the present invention based on FIG. 1 to FIG. 5, a housing 1 is a U-shaped molded product made of synthetic resin and is constituted of a first side wall 1a, a second side wall 1b which is formed in an opposed manner with respect to the first side wall 1a and a connection wall 1c which connects the first and the second side walls 1a, 1b. A space 1d which is formed of a recess is defined by the first and the second side walls 1a, 1b and the connection wall 1c. Further, a first recess 1e having a rectangular shape is formed such that the first recess 1e is extended downwardly from an intermediate portion of the first side wall 1a and a second recess if is formed such that the second recess if is extended from the connection wall 1c to the second side wall 1b. Further, a mounting plate 1g which has a mounting hall 1h is integrally formed with the second side wall 1b. Further, a projection 1k is extended outwardly from and formed on the second side wall 1b.

An insertion member 2 is formed of an L-shaped molded product made of synthetic resin and includes a lid 2a and a mounting portion 2b which is formed such that the mounting portion 2b is extended downwardly from the lid 2a.

A substrate 3 is formed of a thin plate-like insulation substrate and is mounted on a surface of the mounting portion 2b of the insertion member 2 by fixing means such as caulking. A magnetoelectric converting element Hall IC 4 is constituted of an IC on which various types of electric parts such as a Hall element, an amplifier and a comparator are mounted. The magnetoelectric converting element Hall IC 4 has an approximately rectangular shape and a terminal 4a is mounted on the Hall IC 4. The Hall IC 4 is soldered to a center lower portion of the substrate 3. Further, cores of two harnesses 5 are soldered to a center upper portion of the substrate 3 and are projected outwardly after passing through the lid 2a of the insertion member 2.

A bias magnet 6 formed of a magnet having a rectangular shape and is accommodated in a recess of the mounting portion 2b of the insertion member 2. The bias magnet 6 is sandwiched between the substrate 3 and the mounting portion 2b. The bias magnet 6 is arranged to face the Hall IC 4 by way of the substrate 3. To make the bias magnet 6 have an extremely small magnetic force, the bias magnet 6 is formed by mixing ferrite powder into synthetic resin at a low mixing rate.

In this manner, as shown in FIG. 3, the insertion member 2 to which the substrate 3, the harness 5 and the bias magnet 6 are mounted is inserted into the second recess 1f of the housing 1 while being guided by guide grooves 1m which are formed in an opposed manner in the side surfaces of the second recess 1f. Due to such insertion, as shown in FIG. 4, the lid 2a seals the second recess 1f, while the harness 5 is extended outwardly.

The magnet 7 is formed of a magnet such as samarium, cobalt or the like having a strong magnetism of several 100 mT (milli tesla) and is embedded in and fixed to the first recess 1e of the housing 1. Then, although not shown in the drawing, an adhesive agent is filled in the upper recess 1e of the magnet 7 and the upper recess 1f of the lid 2a and the adhesive agent is hardened thereafter. By fixing the magnet 7 in this manner, it is possible to obtain a state in which the Hall IC 4 is arranged between the magnet 7 and the bias magnet 6. It is also possible to obtain a state in which the magnet 7, the Hall IC 4 and the bias magnet 6 are aligned in a straight line. Further, the magnet 7 and the bias magnet 6 are magnetized in a straight line such that magnetic poles of the opposing surfaces have the same poles. Due to such an arrangement, the bias magnet 6 works as a magnet which is inversely biased with respect to the magnet 7 so that the relationship that the magnetic force of the magnet 7 is weakened due to an offset magnetic field of the bias magnet 6 is established. Further, it is possible to freely change the magnetic flux density which the Hall IC 4 detects by changing the magnetic force of the bias magnet 6.

The mounting state and the manner of operation of the seat position sensor S of the present invention having such a constitution are explained hereinafter in conjunction with FIG. 6 to FIG. 8. A seat 11 is general use, is constituted of a seat plate 11a and a backrest 11b and is installed inside an automobile. Each first rail 12 is constituted of two elongated metal members having an L-shaped cross section which are superposed on each other. That is, the first rail 12 includes a base 12a which is extended in the vertical direction and a pair of bends 12b which are formed by bending a lower end of the base 12a in a U-shape. A pair of first rails 12 are mounted on a lower surface of the seat plate 11a. A movable member is constituted of the seat 11 and the first rails 12. Then, to a side wall of the base 12a of one first rail 12, a bolt (not shown in the drawing) which passes through the mounting hall 1h formed in the mounting plate 1g of the housing 1 of the seat position sensor S of the present invention is fastened by a nut (not shown in the drawing). Further, a projection 1k is made to pass through a through Hall 12c formed in the base 12a of the first rail 12 so as to fix the seat position sensor S to the first rail 12. When the seat position sensor S is mounted on the first rail 12, an open side of the space 1d of the housing 1 assumes a state such that the open side is directed downwardly to a floor surface side and hence, it is possible to prevent the space 1d from being filled with dust or the like.

A second rail 13 is constituted of an elongated metal member having a U-shaped cross section and includes a planar base 13a and bends 13b which are formed by being bent upwardly from both ends of the base 13a. The second rail 13 is fixed to an indoor floor surface of an automobile by a pair of desired fixing means thus constituting a fixing member. A shielding plate 14 is made of a metal planar plate and is mounted on the bend 13b of one second rail 13 by means of desired means parallel to the bend 13b of one second rail 13 thus assuming a state in which the shielding plate 14 and the second rail 13 are fixed to each other.

The first rail 12 is movably assembled to the second rail 13 having such a constitution and this assembling is performed by assembling the bends 12b and the bends 13b to each other. Further, the seat 11 is held on the second rail 13 such that the seat 11 is slidably movable.

Then, when the seat 11 is slidably moved, the seat position sensor S is moved along with the movement of the seat 11 and, as shown in FIG. 8, the shielding plate 14 relatively enters the inside of the space 1d and the magnetic force of the magnet 7 is gradually shielded. That is, as indicated by a curve M shown in FIG. 9, the magnetic flux density at a position where the Hall element of the Hall IC 4 is arranged, that is, the magnetic flux density that the Hall element detects is gradually lowered. Then, when the Hall IC 4 reaches the position where the magnetic flux density becomes a threshold value $B_0$ which the Hall IC 4 per se has, the output is changed over and the signal from the harnesses 5 is changed over so that a flow-out quantity of gas at the time of inflation of the air bag (not shown in the drawing) is changed thus enabling the adjustment of the air bag. In this manner, the position of the shielding plate 14 at which the output of the Hall IC 4 is changed over is assumed as a changeover point X and is shown in FIG. 9. This changeover position X is a position of the given seat 11 and is set in view of the necessity of changing the control of the air bag before and behind the changeover position X. This changeover position X is a fixed value corresponding to a specific type of automobile.

Further, since the bias magnet 6 is arranged to face the magnet 7 in an opposed manner, as shown in FIG. 9, the magnetic flux density curve M of a case in which the bias magnet 6 (inverse bias) is provided exhibits the lower magnetic flux density in average than that of the magnetic flux density curve M1 of a case in which the bias magnet is not provided. Further, the magnetic flux density of the curve M becomes substantially 0 when the shielding plate 14 enters. This implies that the influence of leaking magnetic flux is substantially eliminated due to the bias magnet 6. In this manner, the magnetic flux density curve can be freely subjected to the parallel movement with the use of the bias magnet 6.

Further, since the sensitivity of the Hall ICs 4 has large irregularities such that some Hall IC 4 has the good sensitivity and other Hall ICs 4 have the poor sensitivity, their threshold values Bo are also extremely made different from each other and the changeover position X is also varied depending on the type of an automobile. However, since the magnetic flux density curve can be freely moved, the seat position sensor can use various types of Hall ICs 4 so that the yield rate can be enhanced. Further, since the magnetic flux density can be set to 0, it is possible to use the Hall IC 4 having an extremely high sensitivity so that the yield rate is further enhanced. Then, it is also possible to changeover the output of the Hall IC4 at various changeover positions X.

Further, with respect to the seat position sensor of the present invention, as shown in FIG. 7, an end surface 14a of a connection wall 1c side (height direction) of the shielding plate 14 is positioned at the connection wall side compared to the magnet 7 and also is set higher than the magnet 7 so that the influence of the leaking magnetic flux can be minimized. Still further, since the magnetization surface of the magnet 7 is arranged parallel to the shielding plate 14, the leaking magnetic flux can be effectively shielded by the shielding plate 14.

Further, the magnetic flux density curve can be moved with the provision of the bias magnet 6. Accordingly, assuming that the changeover position X is obtained, the Hall IC 4 is classified into the Hall IC having the good sensitivity H1, the Hall IC having the usual sensitivity H2 and the Hall IC having the poor sensitivity H3, the bias magnet 6 is classified into the bias magnet 6 having the strong magnetic force B1, the bias magnet 6 having the usual magnetic force B2 and the bias magnet 6 having the weak magnetic force B3, the bias magnet 6 having the strong magnetic force B1 is mounted when the Hall IC H1 is used as the Hall IC having the good sensitivity, and the magnetic flux density at this changeover position X is made to agree with the magnetic flux density at which the changeover of the Hall IC H1 is performed, it is possible to provide the seat position sensor of high reliability which can changeover the output of the Hall IC 4 at the changeover position with high accuracy so that the yield rate can be enhanced. Further, when the magnetic flux density at the time of changeover of the Hall IC is approximately twice as large as the threshold value Bo, the bias magnet is unnecessary. Further, when the magnetic flux density Bo is increased, the bias magnet in the normal direction may be used. Accordingly, it is possible to use the Hall ICs having any sensitivity.

Further, when the seat 11 is slidably moved, the shielding plate 14 further enters the seat position sensor S in the entering direction. In this movement in the entering direction, once the shielding plate 14 is positioned in the space 1d, the shielding plate 14 is always positioned inside the space id so that magnetic flux density is increased inversely whereby there is no fear that the changeover of the Hall IC 4 is performed. Accordingly, the changeover of the output of the Hall IC 4 is performed only once so that it is reliably detected that the seat 11 is disposed in front of the changeover position X.

Further, when the seat 11 is slidably moved in the opposite direction, the shielding plate 14 is relatively moved in the exiting direction and gradually exits from the space 1d and the magnetic flux density is gradually increased in an interlocking manner with the exiting of the shielding plate 14. Then, the output of the Hall IC 4 is changed over at the changeover position X so that a flow-out quantity of gas at the time of inflation of the airbag (not shown in the drawing) is changed whereby the adjustment of the airbag is performed.

Then, in the same manner as the entering direction, with respect to the exiting direction, once the shielding plate 14 exits from the space 1d, in the movement in the exiting direction, there is no possibility that the shielding plate 14 enters the inside of the space 1d again. Accordingly, the changeover of the output of the Hall IC 4 is performed only once so that it is surely detected that the seat 11 is disposed behind the changeover position X.

Although the seat position sensor S of the present invention has the abovementioned constitution and the manner of operation, the present invention is not limited to the abovementioned embodiment. For example, although the Hall IC 3 is provided as the magnetoelectric converting element in the abovementioned embodiment, an MR element such as a GMR (Giant Magneto Resistance) or the like may be used. Since the MR and GMR detect the magnetic flux density of a horizontal component (in the direction parallel to the direction that the first rail 12 or the like is extended), by making the magnet and the bias magnet magnetized in the direction that the first rail 12 or the like is extended and by making the magnetic pole surface of the magnet and the bias magnet as viewed from the advancing direction of the shield plate 14 different from each other, the bias magnet becomes the inverse bias magnet. Further, although the magnet 7 is mounted on the first side wall 1a and the bias magnet 6 is mounted on the second side wall 1b in this embodiment, these magnets may be arranged in a reverse manner.

As has been described heretofore, the seat position sensor of the present invention is constituted such that the seat position sensor includes the housing, the magnetoelectric converting element which is held by the housing and performs the changeover of the output at a given magnetic field intensity, and a magnet which is held by the housing at a position where the magnet faces the magnetoelectric converting element in an opposed manner, wherein a shielding plate is capable of entering into or exiting from a space defined between the magnetoelectric converting element and the magnet, and an inverse bias magnet which applies a magnetic field of an inverse direction to the magnet is provided at a side opposite to the magnet side while sandwiching the magnetoelectric converting element therebetween. Due to such a constitution, the influence of the leaking magnetic flux can be reduced so that it is possible to use the magnetoelectric converting element having the good sensitivity thus enhancing the yield rate. Further, since the magnetic flux density can be controlled, it is possible to provide the seat position sensor having the high yield rate using the magnetoelectric converting elements in a wide range which differ in the threshold value.

Further, according to the present invention, the magnetoelectric converting element and the magnet of the seat position sensor are respectively mounted on either one of the first and the second side walls, the shielding plate is formed in a planar shape and is allowed to be disposed inside the recess from the opening side of the recess toward the connecting wall, and the end surface of the shielding plate at the connection wall side is positioned closer to the connection wall side than the magnet. Due to such a constitution, the influence of the leaking magnetic flux can be further reduced.

Further, according to the present invention, the housing is arranged such that the open-side of the recess of the space of the seat position sensor is positioned downwardly. Since the recess is directed downwardly, the dust or the like is not filled inside the space and hence, it is possible to provide the reliable seat position sensor.

Further, according to the present invention, the bias magnet is arranged at the first or second side wall on which the magnetoelectric converting element of the seat position sensor is mounted, and the bias magnet, the magnetoelectric converting element and the magnet are positioned on one straight line. Accordingly, by utilizing an offset magnetic field of the bias magnet most efficiently, the magnetic flux density can be controlled more reliably.

Further, according to the present invention, the magnetoelectric converting element of the seat position sensor is constituted of the Hall element and the magnetizing surface of the magnet is disposed parallel to the shielding plate. Accordingly, the leaking magnetic flux can be further reduced.

Further, the changeover of the output of the magnetoelectric converting element is performed only once with respect to the movement in the exiting direction or in the entering direction of the shielding plate which is capable of entering into or exiting from the space of the seat position sensor according to the present invention. Accordingly, the position sensor which can detect the movement of the seat in one direction and the movement of the seat in another direction from the given position can be easily provided.

Further, according to the present invention, the housing of the seat position sensor is arranged at the movable member side including the seat, the shielding plate is arranged at the fixed member side which holds the movable member in a movable manner, and the housing is slidably moved along with the slide movement of the movable member so as to allow the shielding plate to enter into or exit from the space. Accordingly, the constitution which provides the easy entering and exiting of the shielding plate to and from the sliding plate can be realized.

What is claimed is:

1. A seat position sensor comprising a housing, a magnetoelectric converting element which is held by the housing and performs changeover of an output at a given magnetic field intensity, and a magnet which is held by the housing at a position where the magnet faces the magnetoelectric converting element in an opposed manner, wherein a shielding plate is capable of entering into or exiting from a space defined between the magnetoelectric converting element and the magnet, and wherein an inverse bias magnet which applies a magnetic field of an inverse direction to the magnet is provided at a side opposite to the magnet side while sandwiching the magnetoelectric converting element therebetween.

2. A seat position sensor according to claim 1, wherein the housing includes a first side wall, a second side wall which faces the first side wall in an opposed manner, and a connection wall which connects the first with the second side walls and forms the space into a recess, wherein the magnetoelectric converting element and the magnet are respectively mounted on either one of the first and the second side walls, wherein the shielding plate is formed in a planar shape and is allowed to be disposed inside the recess from an opening side of the recess toward the connecting wall, and wherein an end surface of the shielding plate at the connection wall side is positioned closer to the connection wall side than the magnet.

3. The seat position sensor according to claim 2, wherein the housing is arranged such that the open-side of the recess of the space is positioned downwardly.

4. The seat position sensor according to claim 2, wherein the bias magnet is arranged at the first or the second side walls on which the magnetoelectric converting element is arranged and the bias magnet, the magnetoelectric converting element and the magnet are positioned on one straight line.

5. The seat position sensor according to claim 1, wherein the magnetoelectric converting element is constituted of a Hall element and a magnetization surface of the magnet is parallel to the shielding plate.

6. The seat position sensor according to claim 1, wherein the changeover of the output of the magnetoelectric converting element is performed only once with respect to movement in an exiting direction or in an entering direction of the shielding plate which is capable of entering into or exiting from the space.

7. A seat position sensor according to claim 1, wherein the housing is arranged at a movable member side including a seat, the shielding plate is arranged at a fixed member side which holds the movable member in a movable manner, and the housing is slidably moved along with the slide movement of the movable member so as to allow the shielding plate to enter into or exit from the space.

* * * * *